US012322371B2

(12) United States Patent
Zhang et al.

(10) Patent No.: US 12,322,371 B2
(45) Date of Patent: Jun. 3, 2025

(54) ACTIVE NOISE CONTROL AUDIO DEVICES, METHODS, AND STORAGE MEDIA

(71) Applicant: SHENZHEN SHOKZ CO., LTD., Guangdong (CN)

(72) Inventors: Chengqian Zhang, Shenzhen (CN); Jinbo Zheng, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 211 days.

(21) Appl. No.: 18/169,228

(22) Filed: Feb. 15, 2023

(65) Prior Publication Data

US 2023/0252969 A1 Aug. 10, 2023

Related U.S. Application Data

(63) Continuation of application No. PCT/CN2022/075569, filed on Feb. 8, 2022.

(51) Int. Cl.
*G10K 11/178* (2006.01)

(52) U.S. Cl.
CPC .. *G10K 11/17881* (2018.01); *G10K 11/17853* (2018.01)

(58) Field of Classification Search
CPC ... G10K 2210/3044; G10K 2210/3013; G10K 2210/3028; G10K 2210/3026; G10K 2210/506; G10K 11/17875
See application file for complete search history.

(56) References Cited

U.S. PATENT DOCUMENTS 8,718,291 B2 * 5/2014 Alves ............... G10K 11/17815 381/71.8
2011/0002476 A1 1/2011 Morishima et al.
2011/0206214 A1 8/2011 Christoph et al.
2011/0211707 A1 9/2011 Fuller
(Continued)

FOREIGN PATENT DOCUMENTS

CN 111935589 A 11/2020
CN 112383860 A 2/2021
(Continued)

OTHER PUBLICATIONS

International Search Report in PCT/CN2022/075569 mailed on Oct. 26, 2022, 10 pages.
(Continued)

*Primary Examiner* — Ping Lee
(74) *Attorney, Agent, or Firm* — METIS IP LLC

(57) ABSTRACT

The present disclosure provides an active noise control audio device, method and storage medium. The device includes: a speaker, a microphone, an analog filter, and a processing circuit. The speaker used to generate a noise reduction sound; the microphone used to collect an environmental noise and the noise reduction sound and generate a first analog signal; the analog filter used to provide a gain for the first analog signal and to generate a second analog signal, the second analog signal driving the speaker to generate the noise reduction sound; and the processing circuit used to send a control instruction to the analog filter to adjust the gain and a phase shift of the analog filter according to the first analog signal and the second analog signal.

20 Claims, 6 Drawing Sheets

(56) References Cited

U.S. PATENT DOCUMENTS

| | | | |
|---|---|---|---|
| 2012/0057720 | A1 | 3/2012 | Van Leest |
| 2015/0104031 | A1 | 4/2015 | Park et al. |
| 2017/0053637 | A1 | 2/2017 | Defranks et al. |
| 2018/0144736 | A1 | 5/2018 | Huang |
| 2019/0019493 | A1 | 1/2019 | Yano |
| 2020/0312341 | A1 | 10/2020 | Alves et al. |

FOREIGN PATENT DOCUMENTS

| | | | |
|---|---|---|---|
| CN | 112992114 | A | 6/2021 |
| JP | 5114611 | B2 | 1/2013 |
| WO | 2009041012 | A1 | 4/2009 |

OTHER PUBLICATIONS

Written Opinion in PCT/CN2022/075569 mailed on Oct. 26, 2022, 8 pages.

Notice of Reasons for Rejection in Japanese Application No. 2023-555845 mailed on Nov. 12, 2024, 9 pages.

* cited by examiner

ACTIVE NOISE CONTROL AUDIO DEVICES, METHODS, AND STORAGE MEDIA

CROSS-REFERENCE TO RELATED APPLICATIONS

This application is a Continuation of International Application No. PCT/CN2022/075569, filed on Feb. 8, 2022, the entire contents of each of which are hereby incorporated by references.

TECHNICAL FIELD

The present disclosure relates to the field of audio noise control, and in particular to an active noise control audio device, method and storage medium.

BACKGROUND

Environmental noise is often reduced in an audio device by active noise control techniques. For example, the audio device can collect and analyze the external environmental noise through a microphone to generate a noise reduction sound with the opposite phase of the external environmental noise so that when the sound from the audio device enters the human ear, the external environmental noise and the noise reduction sound offset with each other to achieve a noise elimination effect.

A digital filter set is usually used in the audio device to adjust the gain and phase of the signal, but the digital filter set often generates a large time delay when processing the signal resulting in the inability to timely deal with external environmental noises, causing the response of noise reduction to be too slow and affecting the noise reduction effect of the audio device.

Therefore, it is necessary to propose an active noise control audio device that can respond to the noise reduction quickly.

SUMMARY

One embodiment of the present disclosure provides an active noise control audio device. The device includes: a speaker, a microphone, an analog filter and a processing circuit. A speaker is used to generate a noise reduction sound, a microphone is used to collect an environmental noise and the noise reduction sound and generate a first analog signal. An analog filter is used to provide a gain for the first analog signal and to generate a second analog signal, wherein the second analog signal drives the speaker to generate the noise reduction sound. A processing circuit is used to send a control instruction to the analog filter to adjust the gain and a phase shift of the analog filter according to the first analog signal and the second analog signal.

By using an analog filter to adjust the magnitude and the phase of the analog signal and generating the noise reduction sound in this way, the embodiment of this present disclosure can reduce the signal conversion (such as digital-to-analog conversion, etc.) as well as the time delay caused by the digital filter processing, allowing the audio device to perform the noise reduction response in a timely manner, thus improving the noise reduction effect.

Moreover, the active noise control audio device provided by the embodiment of this present disclosure can also be provided with a processing circuit, through which the gain and a phase shift of the analog filter are adjusted according to the analog signal corresponding to the environmental noise and the noise reduction sound, so that the analog filter achieves an optimal response to the environmental noise and further improves the noise reduction effect.

In some embodiments, as a change of an amplitude of the first analog signal within a specific time range, the processing circuit controls the analog filter dynamically to adjust the gain of the analog filter.

In some optional embodiments, the processing circuit includes a first analog-to-digital converter and a second analog-to-digital converter. The first analog-to-digital converter samples the first analog signal to generate a first digital signal, the second analog-to-digital converter samples the second analog signal to generate a second digital signal. The processing circuit sends the control instruction to the analog filter based on the first digital signal and the second digital signal.

In some embodiments, the analog filter includes a switching gating circuit and a response regulator, wherein the switching gating circuit adjusts a resistance value or a capacitance value of the response regulator to change an amplitude frequency response and a phase frequency response of the analog filter according to the control instruction.

In some embodiments, the response regulator includes one or more phasing units, each phasing unit including at least one adjustable resistor or at least one adjustable capacitor. The switching gating circuit adjusts the resistance value of the adjustable resistor or the capacitance value of the adjustable capacitor according to the control instruction.

In some optional embodiments, the active noise control audio device further includes a first analog adder, a first analog-to-digital converter, and a third analog-to-digital converter. The first analog adder is used to generate a third analog signal based on the first analog signal, the second analog signal, and a secondary response corresponding to the second analog signal, the secondary response being a response from the speaker to the microphone. The first analog-to-digital converter samples the first analog signal to generate a first digital signal, the third analog-to-digital converter samples the third analog signal to generate a third digital signal. The processing circuit sends the control instruction to the analog filter according to the first digital signal and the third digital signal.

In some embodiments, the active noise control audio device further including a fixing structure, the fixing structure fixing the speaker and the microphone respectively in a position near an ear of a user and not blocking the ear canal of the user.

In some optional embodiments, the active noise control audio device further includes a first analog adder, a third analog-to-digital converter, and a fourth analog-to-digital converter. The first analog adder is used to generate a third analog signal based on the first analog signal, the second analog signal, and a secondary response corresponding to the second analog signal, the secondary response is a response from the speaker to the microphone. The third analog-to-digital converter samples the third analog signal to generate a third digital signal, the fourth analog-to-digital converter samples the second analog signal after adding the secondary response to generate a fourth digital signal. The processing circuit determines a fifth digital signal based on the third digital signal and a transfer function between the ear canal of the user and the microphone; and sends the control instruction to the analog filter based on the fourth digital signal and the fifth digital signal.

In some embodiments, the transfer function between the ear canal of the user and the microphone is obtained by an experimental test, or based on a statistical model or a neural network model.

In some embodiments, the processing circuit periodically sends the control instruction to the analog filter.

One embodiment of the present disclosure provides an active noise control method. The method includes: generating a noise reduction sound; collecting an environmental noise and the noise reduction sound and generating a first analog signal; providing a gain for the first analog signal and to generate a second analog signal, the second analog signal driving the speaker to generate the noise reduction sound by using an analog filter; and sending a control instruction to adjust the gain and a phase shift of the analog filter according to the first analog signal and the second analog signal.

In some embodiments, the adjusting the gain and the phase shift of the analog filter includes as a change of an amplitude of the first analog signal within a specific time range, controlling the analog filter dynamically to adjust the gain of the analog filter.

In some embodiments, the method further includes: sampling the first analog signal to generate a first digital signal; sampling the second analog signal to generate a second digital signal; and the sending a control instruction includes: sending the control instruction based on the first digital signal and the second digital signal.

In some embodiments, the method further includes: adjusting a resistance value or a capacitance value of the response regulator to change an amplitude frequency response and a phase frequency response of the analog filter according to the control instruction.

In some embodiments, the response regulator includes one or more phasing units, each phasing unit including at least one adjustable resistor or at least one adjustable capacitor. The adjusting the resistance value or the capacitance value of the response regulator according to the control instruction includes: adjusting the resistance value of the adjustable resistor or the capacitance value of the adjustable capacitor according to the control instruction.

In some embodiments, the method further includes: generating a third analog signal based on the first analog signal, the second analog signal, and a secondary response corresponding to the second analog signal, the secondary response being a response from the speaker to the microphone; sampling the first analog signal to generate a first digital signal; sampling the third analog signal to generate a third digital signal; and the sending a control instruction to the analog filter includes: sending the control instruction according to the first digital signal and the third digital signal.

In some embodiments, the method further includes: generating a third analog signal based on the first analog signal, the second analog signal, and a secondary response corresponding to the second analog signal; wherein the secondary response is a response from the speaker to the microphone; sampling the third analog signal to generate a third digital signal; sampling the second analog signal after adding the secondary response to generate a fourth digital signal; and the sending a control instruction includes: determining a fifth digital signal based on the third digital signal, and a transfer function between the ear canal of the user and the microphone; sending the control instruction based on the fourth digital signal and the fifth digital signal.

In some embodiments, the transfer function between the ear canal of the user and the microphone is obtained by an experimental test, or based on a statistical model or a neural network model.

In some embodiments, the method further includes: periodically sending the control instruction.

One embodiment of this present disclosure provides a non-transitory computer-readable storage medium storing computer instructions, wherein when reading the computer instructions in the storage medium, a computer implements the following method, comprising: generating a noise reduction sound; collecting an environmental noise and the noise reduction sound and generate a first analog signal; providing a gain for the first analog signal and to generate a second analog signal, the second analog signal driving the speaker to generate the noise reduction sound by using an analog filter; and sending a control instruction to adjust the gain and a phase shift of the analog filter according to the first analog signal and the second analog signal.

BRIEF DESCRIPTION OF THE DRAWINGS

This description will be further illustrated by means of exemplary embodiments which will be described in detail through accompanying drawings. These embodiments are not restrictive, in which the same numbering indicates the same structure, wherein.

DETAILED DESCRIPTION

Figure 1:
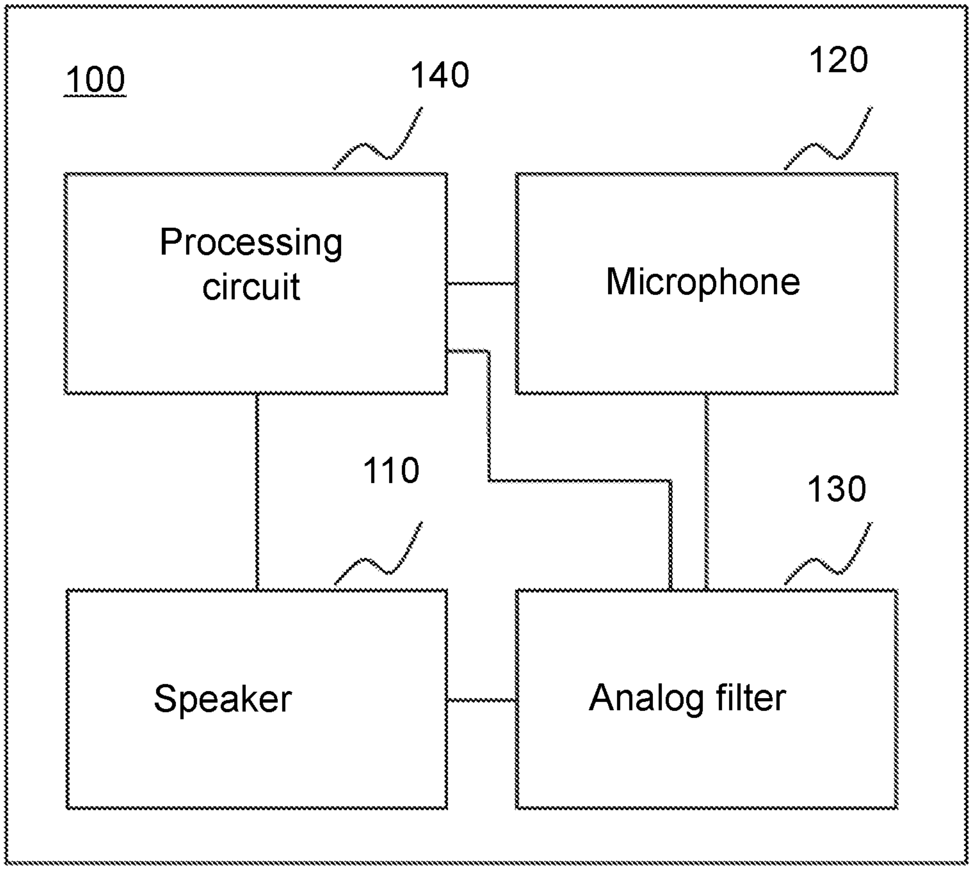
FIG. 1 is a block diagram illustrating a structure of an active noise control audio device according to some embodiments of the present disclosure.

In order to more clearly explain the technical scheme of the embodiments of this disclosure, a brief description of the accompanying drawings to illustrate the embodiments is given below. Obviously, the accompanying drawings below are only some examples or embodiments of the present disclosure, and it is possible for ordinary technicians skilled in the art to apply the present disclosure to other similar scenarios according to these accompanying drawings without creative effort. Unless obviously obtained from the context or the context illustrates otherwise, the same numeral in the drawings refers to the same structure or operation.

It should be understood that the "system", "device", "unit", and/or "module" used in the present disclosure are to distinguish different components, elements, parts, portions or assemblies in different levels. However, if other words serve the same purpose, the words may be replaced by other expressions.

As shown in the present disclosure, the words "one", "a", "an", "this" and/or "the" are not specially refer to the singular form but may include the plural form unless the context expressly suggests otherwise. In general, the terms "comprise", "comprising", "comprises", "including", "includes", and "include" imply the inclusion only of clearly identified steps and elements that do not constitute an exclusive listing, and other steps or elements may be included.

Flow charts are used in the present disclosure to illustrate the operations performed according to the system of the embodiments of the present disclosure. It should be understood that the previous or subsequent operations may not be accurately implemented in order. Instead, each operation may be processed in reverse order or simultaneously. Meanwhile, other operations may also be added to these processes, or a certain operation or several operations may be removed from these processes.

The active noise control audio device of one or more embodiments of this present disclosure may provide a noise reduction sound in response to an environmental noise for application in a variety of scenarios where environmental noise interference needs to be avoided. For example, the noise reduction sound may be provided to an audio output device (e.g., stereo, headphones, etc.) to improve the quality of the output audio; as another example, the noise reduction sound may be provided for the audio input device (such as a pickup, a microphone, etc.) to improve the quality of collected audio. In some embodiments, the active noise control audio device may adjust the output noise reduction sound in real time according to the environmental noise, so that the active noise control audio device can respond to the environmental noise in an optimal manner and improve the noise reduction effect.

In some embodiments, the active noise control audio device may be a feedback active noise control audio device or a feed-forward active noise control audio device. The microphone of the feed-forward active noise control audio device mainly receives the environmental noise, and then the speaker generates a corresponding noise reduction sound for noise reduction. The microphone of the feedback active noise control audio device may simultaneously collect the environmental noise and the noise reduction sound generated by the speaker, and then the processing circuit, according to the superposition effect of the environmental noise and noise reduction sound, generates a feedback signal for adjusting the noise reduction sound by driving the speaker, so as to achieve the noise reduction effect. In some embodiments, the active noise control audio device may also use other noise reduction methods, such as a combination of feed-forward and feedback active noise control.

Currently, the active noise control audio device may include a set of digital filters (also referred to as digital filter set), an analog-to-digital converter, and a digital-to-analog converter. The analog-to-digital converter may convert the sound received by the microphone (the environmental noise, or the sound after the superposition of the environmental noise and the noise reduction sound) into a digital signal; the digital filter set processes the digital signal to generate the corresponding noise reduction digital signal; and the digital-to-analog converter converts the noise reduction digital signal into an analog signal and outputs it through the speaker to offset the environmental noise. However, the use of the digital filter set for signal processing may generate a large time delay, which can easily lead to the active noise control audio device not deal with the external environmental noise in a timely manner, resulting in the slow response to noise reduction, affecting the real-time noise reduction effect of the audio device.

The active noise control audio device provided by the embodiments of this present disclosure uses an analog filter to directly process the analog signal corresponding to the noise reduction sound (e.g., gain or phase shift), which can reduce the step of signal conversion (e.g., digital-to-analog conversion, etc.) and the time delay caused by the digital filter processing, allowing the audio device to perform the noise reduction process in a timely manner, thereby improving the noise reduction effect.

Moreover, the active noise control audio device provided by the embodiments of this present disclosure may include a processing circuit, through which the gain and the phase shift of the analog filter are adjusted according to the analog signal corresponding to the environmental noise and the noise reduction sound, so that the analog filter achieves an optimal response to the environmental noise and further improves the noise reduction effect.

FIG. 1 is a block diagram illustrating a structure of an active noise control audio device according to some embodiments of the present disclosure. In some embodiments, as shown in FIG. 1, the active noise control audio device 100 may include: a speaker 110, a microphone 120, an analog filter 130, and a processing circuit 140.

The speaker 110 is a transducer device that converts an electrical signal into an acoustic signal. In some embodiments, the active noise control audio device 100 is open headphones, and the speaker 110 may be located near but not blocking a user's ear. For example, a support structure of the open headphones may fix the speaker (or a housing accommodating the speaker) on the circumference of the user's ear (e.g., the front of the antilobium) or inside the contour of the ear (e.g., near the triangular fossa) in a hanging or clamping manner. In some embodiments, the active noise control audio device 100 is non-open headphones (e.g., in-ear headphones or over-ear headphones), and the support structure for the non-open headphones may make the speaker 110 set in the user's ear canal or in a closed space formed by the housing structure around the user's ear. In some embodiments, the support structure may be an ear-hanging bracket, a head-hanging bracket, and other fixtures. Exemplarily, the active noise control audio device 100 may be outgoing headphones, a speaker, bone conduction headphones, air conduction headphones, an AR device, a VR device, a head-mounted audio device, an in-car audio device, hearing aids, etc. or, optionally, the active noise control audio device 100 may be used as part of an in-car audio system or an in-room audio system to provide active noise control at specific locations in space.

In some embodiments, the active noise control audio device 100 may be replaced with an active noise control system. The active noise control system may include one or more of a speaker, a microphone, an analog filter, and a processing circuit having the same functions as the speaker 110, microphone 120, analog filter 130, and processing circuit 140 in the active noise control audio device 100, respectively. Of course, one or more of the speaker, microphone, analog filter, and processing circuit in the active noise control system may be integrated and set in the same device, or they may each exist separately as independent devices for active noise control at specific locations in space. Exemplarily, the active noise control system may include an in-car noise reduction system, in which the speaker and the microphone may be set in separate devices, and the analog filter and the processing circuit may be integrated in the same processing module.

In some embodiments, the speaker 110 may output a noise reduction sound that is in opposite phase to the environmental noise so that the noise reduction sound can be offset from the environmental noise. Further, the phase difference between the noise reduction sound and the environmental noise at the user's ear canal may be 180 degrees. In some embodiments, the speaker 110 may also output other audio, such as a reminder sound, audio played on demand by the user, etc.

The microphone 120 is a transducer device that converts an acoustic signal into an electrical signal. In some embodiments, the microphone 120 may collect both the environmental noise and the noise reduction sound, and transmit the collected sound to the analog filter 130 or the processing circuit 140 for processing, providing feedback on the value and the phase of the noise reduction sound, making the sound collected by the microphone 120 as small as possible, the microphone herein may be referred to as a feedback microphone. The feedback microphone may be set close to the user's ear canal so that the received sound is as close as possible to the actual sound received by the user's ear. In some embodiments, the microphone 120 may be used primarily to collect the environmental noise and as little as possible of the noise reduction sound produced by the speaker 110, the microphone herein may be referred to as a feed-forward microphone. To reduce the influence of the speaker 110 on the feed-forward microphone, a physical structure that isolates sound transmission may be disposed between the feed-forward microphone and the speaker 110, or the feed-forward microphone may be provided at a location away from the speaker 110, or the feed-forward microphone may be located near the acoustic zero point of the speaker 110.

In some embodiments, when the microphone is a feedback microphone, both the environmental noise and the noise reduction sound can be collected, and a first analog signal corresponding to the environmental noise and the noise reduction sound can be generated. The amplitude of the first analog signal may reflect the extent to which the environmental noise and the noise reduction sound offset with each other. To achieve the desired noise reduction effect, the amplitude of the first analog signal may be as small as possible, or even reduced to zero.

It should be noted that compared to closed or semi-open audio devices, the microphone in an open audio device is not set at the user's ear canal, resulting in a discrepancy between the sound received by the user's ear canal and the sound received by the microphone. In some embodiments, a transfer function between the user at the ear canal and the microphone may be constructed, representing the correspondence between the sound signal received by the user's ear canal and the sound signal received by the microphone. The specific implementation of the open audio device can be found in the relevant parts of FIG. 6 below and will not be repeated here.

Figure 2:
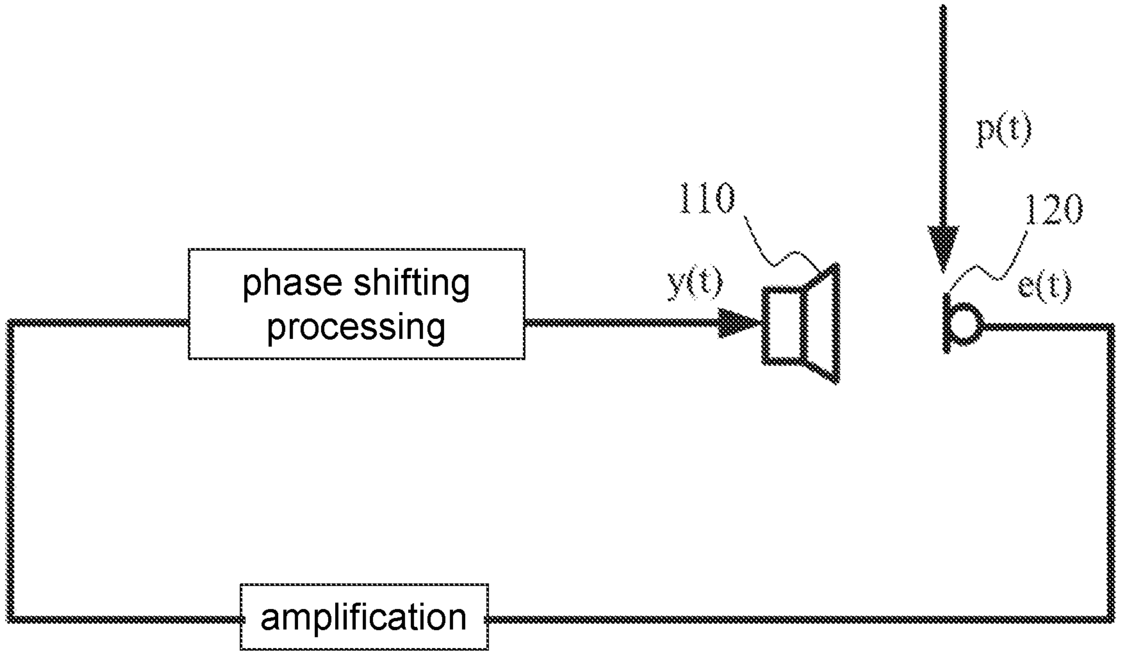
FIG. 2 is a schematic diagram illustrating a simplified structure of an active noise control audio device according to some embodiments of the present disclosure.

To better describe the relationship between the speaker 110 and the microphone 120, FIG. 2 depicts the specific implementation of the speaker and the microphone by way of example.

FIG. 2 is a schematic diagram illustrating a simplified structure of an active noise control audio device according to some embodiments of the present disclosure.

As shown in FIG. 2, y(t) represents the analog signal received by the speaker 110 corresponding to the noise reduction sound, also referred to as the second analog signal, whereby the speaker 110 may generate the noise reduction sound; p(t) represents the analog signal corresponding to the environmental noise when it is received by the microphone 120; e(t) represents the first analog signal generated by the microphone 120 in response to receiving the environmental noise and the noise reduction sound simultaneously. As a result, the relationship between the above three signals may be represented as:

$$e(t)=p(t)+y(t). \quad (1)$$

In some embodiments, in order that the generated noise reduction sound can cancel with the environmental noise, the first analog signal e(t) is processed in a certain way (e.g., phase shifting by a term shifter and amplification by an amplifier) to generate the second analog signal y(t). Ideally, the second analog signal y(t) and the analog signal p(t) corresponding to the environmental noise can cancel or offset with each other, thus reducing the amplitude of the first analog signal e(t) to zero. It should be noted that the description of the processing of the first analog signal e(t) here is for illustrative purposes only and does not limit the corresponding improvements made by those skilled in the art based on an understanding of the principles. For example, the first analog signal e(t) may be phase shifted or amplified by a different electronic device, such as an amplifier and a phase shifter, or the first analog signal e(t) may be phase shifted and amplified by the same electronic device (e.g., an analog filter) at the same time.

The analog filter 130 is a circuit device for filtering analog signals or continuous time signals. In some embodiments, the analog filter 130 may perform a signal processing on the analog signal. Exemplarily, the analog filter 130 may simultaneously phase shift and amplify the analog signal to adjust the phase and amplitude of the analog signal.

In some embodiments, the analog filter 130 may be used to provide a gain for the first analog signal and generate a second analog signal, which drives the speaker 110 to produce a noise reduction sound. Exemplarily, with continued reference to FIG. 2 above, the gain of the analog filter 130 may be represented as h(t) in the time domain and H(s) in the frequency domain, and the analog filter 130 may provide a gain h(t) for the first analog signal e(t) and generate a second analog signal y(t). As a result, the relationship between the above three signals can be represented in the time domain as:

$$y(t)=e(t)*h(t), \quad (2)$$

wherein * is the convolution operation. In some embodiments, the correspondence relationship between the first analog signal e(t) and the gain h(t) of the analog filter 130 in the time domain and frequency domain, respectively, according to Equation (1) and Equation (2) above, can be represented as:

$$\begin{cases} e(t) = p(t) + e(t) * h(t) \\ E(s) = P(s)/(1 - H(S)) \end{cases}, \quad (3)$$

wherein E(s) is the representation of the first analog signal in the frequency domain, P(s) is the representation of the analog signal corresponding to the environmental noise in the frequency domain, and H(S) is the gain of the analog filter 130 in the frequency domain.

As shown in Equation (3), the greater the gain H(s) of the analog filter 130, the closer the value of the first analog signal E(s) is to zero, the closer it is to the ideal state of active noise control (i.e., the second analog signal y(t) and the analog signal p(t) corresponding to the environmental noise can cancel each other out). As a result, the active noise control audio device 100 may be provided with the analog filter 130 having a large gain H(s) to improve the noise reduction effect.

In some embodiments, the analog filter 130 may adjust its own gain and phase shift in response to the control instruction from the processing circuit 140 to avoid too much gain or too little gain resulting in unstable noise reduction of the active noise control audio device 100. Exemplarily, when the active noise control audio device 100 is in the initial state, the value of the first analog signal is mainly derived from the contribution of environmental noise (i.e., the second analog signal in the initial state is small or approximately zero), at which time the analog filter 130 may be set to have a small gain, which can avoid the first analog signal being over-amplified to generate a second analog signal with too large an amplitude at the next moment, and avoid excessive noise reduction sound from the speaker, which cause damage to the device. As the amplitude of the first analog signal changes over a specific time range, the processing circuit 140 may control the analog filter 130 to dynamically adjust its gain. For example, the gain of the analog filter 130 may be continuously increased as the amplitude of the first analog signal decreases over a period of time starting when the active noise control audio device 100 is in its initial state, thereby avoiding too little gain resulting in the second analog signal not being able to cancel out with the analog signal corresponding to the environmental noise. The specific adjustment of the analog filter 130 can be found in the following description about the processing circuit and will not be repeated here. In some embodiments, during the operation of the active noise control audio device 100, the analog filter 130 may also dynamically adjust its gain under the control of the processing circuit 140 for adapting to changes in the environmental noise when there are fluctuations in the environmental noise. For example, at a certain moment, when the environmental noise becomes large, the amplitude of the first analog signal may be correspondingly large, the processing circuit 140 may control the analog filter 130 to reduce its gain to avoid the first analog signal over-amplified and damage to the speaker.

In some embodiments, the analog filter 130 may include a switching gating circuit and a response regulator. The switching gating circuit adjusts a resistance value or a capacitance value of the response regulator according to a control instruction to change the amplitude frequency response and the phase frequency response of the analog filter 130, thereby achieving phase shifting processing and/or amplification of the first analog signal.

In some embodiments, the switching gating circuit may adjust the resistance value or the capacitance value of the response regulator via an analog switch. Further, different channels of the response regulator correspond to different resistance or capacitance values, and the analog switch may change the channels of the response regulator through a location transformation to achieve adjustment of the resistance or capacitance value of the response regulator. Exemplarily, the response regulator includes a potentiometer, and the resistance value of the response regulator may be changed by varying the location of the analog switch and changing the channel of the potentiometer into the circuit.

In some embodiments, the switching gating circuit may adjust the state of the switch itself in response to a control instruction. Exemplarily, in the case where the control instruction is a pulse signal, the switching gating circuit may adjust the location of the analog switch according to the frequency of the pulse signal. In some embodiments, the switching gating circuit may periodically receive the control instruction from the processing circuit 140, and the details of the implementation of the control instruction can be found in the relevant description of the processing circuit below, which will not be repeated here.

The response regulator may be a circuit device that processes the signal. Exemplarily, the response regulator may perform a signal processing (e.g., phase shifting and amplification, etc.) on the input first analog signal to obtain a second analog signal. In some embodiments, the resistance value or capacitance value of the response regulator may affect the amplitude frequency response and phase frequency response of the analog filter 130, thereby affecting the effectiveness of signal processing. Exemplarily, the first analog signal does not change and the resistance value or the capacitance value of the response regulator changes, which may result in a change in the amplitude frequency response and phase frequency response of the analog filter 130, causing the amplitude and phase of the second analog signal output from the analog filter 130 to change accordingly. The following is an example of a phasing unit to explain in detail the specific implementation of the response regulator.

In some embodiments, the response regulator may include one or more phasing units, and each phasing unit may include at least one adjustable resistor or at least one adjustable capacitor. Correspondingly, the switching gating circuit may adjust the resistance value of the adjustable resistor or the capacitance value of the adjustable capacitor according to the control instruction.

Figure 3A:
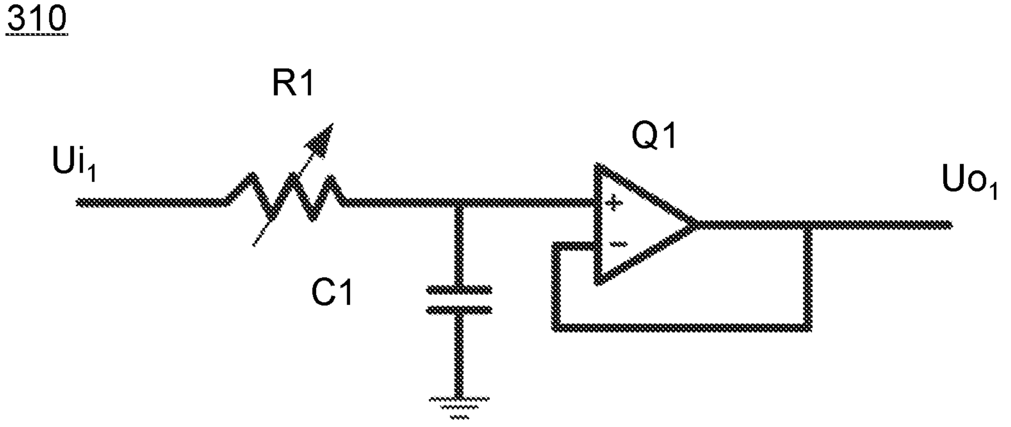
FIG. 3A is a schematic diagram illustrating a structure of a phasing unit according to some embodiments of the present disclosure.
Figure 3B:
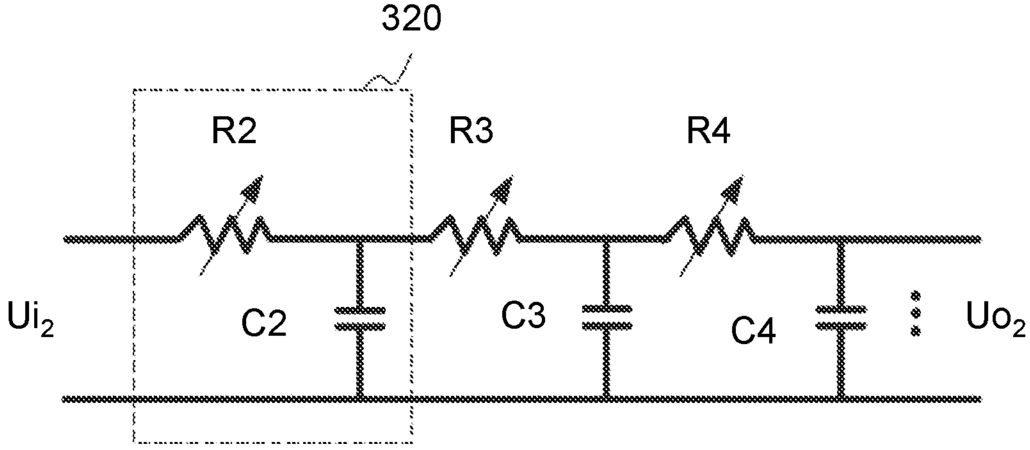
FIG. 3B is a schematic diagram illustrating a structure of a phasing unit according to some embodiments of the present disclosure.

The phasing unit may be a set of circuits having multiple devices with adjustable parameters. In some embodiments, the response regulator may change the resistance value or the capacitance value of the response regulator by changing the resistance value of the adjustable resistor or the capacitance value of the adjustable capacitor in the phasing unit. The adjustable resistor may be a sliding resistor, a potentiometer, a resistor, etc. The specific type of the adjustable resistor may be selected according to the type of the switching gating circuit. The adjustable capacitor may be a chip adjustable capacitor, a plug-in adjustable capacitor, etc. The specific type of the adjustable capacitor may be selected according to the type of the switching gating circuit. FIGS. 3A and 3B depict specific implementations of the phasing unit by way of example.

FIG. 3A is a schematic diagram illustrating a structure of a phasing unit according to some embodiments of the present disclosure.

As shown in FIG. 3A, the phasing unit 310 may include a capacitor C1, a resistor R1, and a voltage follower Q1. The capacitor C1 and the resistor R1 are connected in series, one end of the capacitor C1 is grounded, the connection point of the capacitor C1 and the resistor R1 is connected to the positive phase input of the voltage follower Q1, and the inverted phase input of the voltage follower Q1 is connected to the output. The phasing unit 310 may signalize a signal Ui1 to obtain a signal $U_{o1}$. In this embodiment of the present disclosure, the voltage follower Q1 may avoid the effect of the phasing unit 310 by the rear circuit and maintain the stable operation of the phasing unit 310.

FIG. 3B is a schematic diagram illustrating a structure of a phasing unit according to some embodiments of the present disclosure.

As shown in FIG. 3B, the multiple phasing units 320 are connected in series. One phasing unit 320 may include a capacitor (e.g., capacitor C2) and a resistor (e.g., resistor R2) connected in series, the resistor (e.g., capacitor C2) in that phasing unit 320 is connected in series with the resistors (e.g., resistors R3, R4) of the other phasing units 320, and the capacitor (e.g., capacitor C2) in that phasing unit 320 is connected in parallel with the capacitors (e.g., capacitors C3, C4) of the other phasing units 320. The multiple phasing units 320 may signalize a signal Ui2 to obtain a signal $U_{o2}$.

In some embodiments, the range of the phase frequency response of the response modulator may be adjusted by adjusting the count of the phasing units 320 connected in series. Exemplarily, the greater the count of the phasing units 320 in series, the greater the range of the phase frequency response of the response regulator.

As a result, the transfer function of the phasing units (such as the above phasing unit 310, phasing unit 320) can be represented as:

$$H(jw) = \frac{1}{jwRC + 1}, \tag{4}$$

wherein, R is the resistance value of the resistor in the phasing unit, C is the capacitance value of the capacitor in the phasing unit, correspondingly. The phase frequency response of a phasing unit may be expressed as: −arctan (wRC), and then the range of the phase frequency response may be [−90°,0°].

In some embodiments, the capacitors C1-C4 may be adjustable capacitors, or the resistors R1-R4 may be adjustable resistors. It should be noted that only resistors R1-R4 are shown in FIG. 3A—FIG. 3B as adjustable resistors. Adjusting the capacitance values of the adjustable capacitors (e.g., capacitors C1-C4) or the resistance values of the adjustable resistors (e.g., resistors R1-R4) can make the phase frequency response of the phasing unit change within [−90°, 0° ]. Correspondingly, the switching gating circuit may adjust the access to the circuit according to the control instruction by using the analog switch corresponding to the adjustable devices to realize the adjustment of the capacitance values of the capacitors C1-C4 or the resistance values of the resistors R1-R4.

In this embodiment of the present disclosure, the cooperation of the switching gating circuit and the response regulator makes the amplitude frequency response and phase frequency response of the analog filter 130 adjustable to avoid the analog filter 130 from providing too much or too little gain at a particular moment, so as to make the analog filter 130 achieve the optimal response to the environmental noise and thus improve the noise reduction effect of the active noise control audio device 100.

The processing circuit 140 may be a circuit unit with a data processing control function. In some embodiments, the processing circuit 140 may include an integrated circuit Application Specific Integrated Circuit (ASIC), a field programmable gate array (FPGA), a complex programmable logic device (CPLD), a microcontroller unit (MCU), an operational logic component (Central Processing Unit (CPU), Digital Signal Process (DSP), or Graphics Processing Unit (GPU) circuit modules.

In some embodiments, the processing circuit 140 may control the analog filter 130 to dynamically adjust its gain as the amplitude of the first analog signal changes over a specific time range. Exemplarily, the specific time range may be the time period after the active noise control audio device 100 starts working. As the active noise control audio device 100 starts working, the processing circuit 140 may send a control instruction to gradually increase the gain of the analog filter 130 as the amplitude of the first analog signal decreases, thereby keeping the amplitude of the second analog signal close to the analog signal corresponding to the environmental noise and improving the noise reduction effect of the device.

It should be noted that when the active noise control audio device 100 is in the initial state (i.e., the state in which the active noise control audio device 100 starts working), the amplitude of the first analog signal is large because most of the external environmental noise has not been canceled out, and at this time, the processing circuit 140 can send a control instruction to control the analog filter 130 with a small gain to avoid the amplitude of the second analog signal from being too large and to ensure that the active noise control audio device 100 can work stably in the initial state.

In some embodiments, the processing circuit 140 may send the control instruction to the analog filter 130 to adjust the gain and phase shift of the analog filter 130 based on the first analog signal and the second analog signal.

The first analog signal may reflect the extent to which the environmental noise and the noise reduction sound offset with each other, and the second analog signal may reflect the magnitude of the noise reduction sound. In some embodiments, the control instruction may be a high level signal or a pulse signal, etc. The specific type of the control instruction may be selected based on the type of processing circuit 140.

Figure 4:
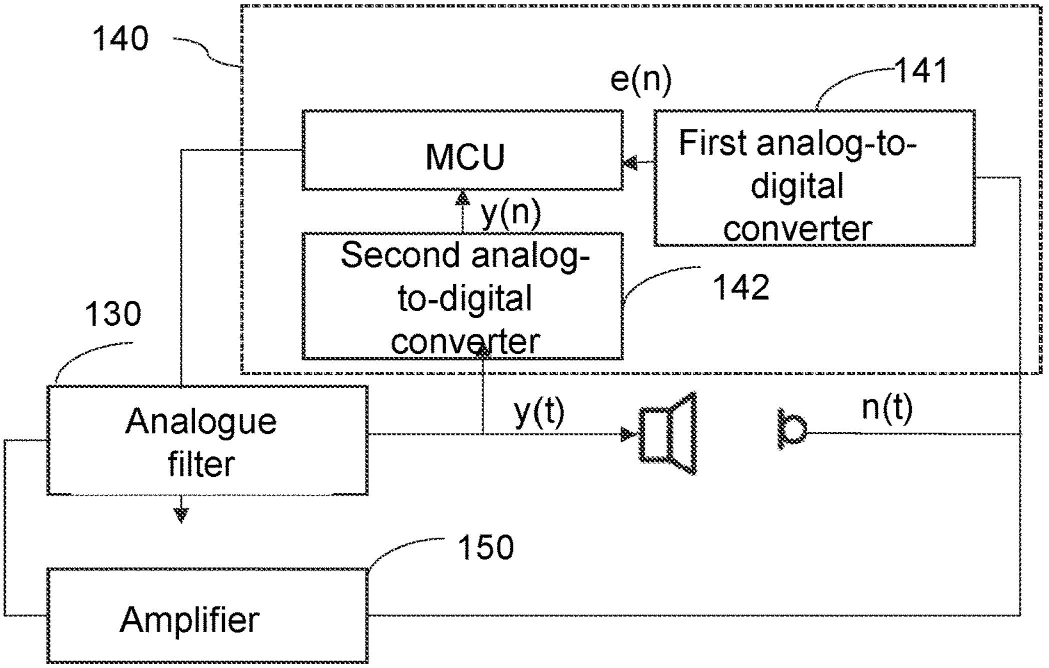
FIG. 4 is a schematic diagram illustrating a structure of an active noise control audio device according to some embodiments of the present disclosure.

In some embodiments, the processing circuit 140 may adjust the gain and phase shift of the analog filter 130 by adjusting the frequency of the control instruction. FIG. 4 details, by way of example, the specific implementation of the processing circuit 140.

FIG. 4 is a schematic diagram illustrating a structure of an active noise control audio device according to some embodiments of the present disclosure.

As shown in FIG. 4, y(t) represents the second analog signal and e(t) represents the first analog signal, and the processing circuit 140 can calculate the coefficients (e.g., gain and phase shift) of the desired analog filter 130 based on the first analog signal e(t) and the second analog signal y(t), and calculate the amplitude frequency response and phase frequency response of the analog filter 130, generate a control instruction corresponding to the amplitude frequency response and phase frequency response, and send it to the analog filter 130. The analog filter 130 may adjust its own gain and phase shift according to this control instruction, so that the actual gain and phase shift of the analog filter 130 are close to the calculated gain and phase shift. The specific implementation of the adjustable analog filter 130 can be referred to the relevant contents of FIGS. 3A-FIG. 3B above and will not be repeated here.

In this embodiment of the present disclosure, the control instruction is generated by the processing circuit 140 according to the analog signal corresponding to the environmental noise and the noise reduction sound to adjust the gain and phase shift of the analog filter 130, so that the analog filter 130 achieves the optimal response to the environmental noise and further improves the noise reduction effect.

In some embodiments, the processing circuit 140 may include a first analog-to-digital converter and a second analog-to-digital converter, the first analog-to-digital converter sampling a first analog signal to generate a first digital signal and the second analog-to-digital converter sampling a second analog signal to generate a second digital signal. Correspondingly, the processing circuit 140 may send the control instruction to the analog filter 130 based on the first digital signal and the second digital signal.

In some embodiments, the analog-to-digital converter (e.g., first analog-to-digital converter, second analog-to-digital converter) may sample an analog signal (e.g., first analog signal, second analog signal) to generate a discrete digital signal (e.g., first digital signal, second digital signal) based on a preset sampling rate. Correspondingly, the processing circuit 140 may generate the control instruction based on the first digital signal and the second digital signal. Exemplarily, as shown in FIG. 4, the first analog-to-digital converter 141 samples the first analog signal e(t) to generate the first digital signal e(n), and the second analog-to-digital converter 142 samples the second analog signal y(t) to generate the second digital signal y(n).

In some implementations, the processing circuit 140 may calculate the coefficients (e.g., gain and phase shift) of the analog filter 130 based on the first digital signal and the second digital signal by using a noise reduction algorithm such as an adaptive filtering algorithm (Least Mean Square, LMS), a filtered-x least mean square algorithm (FXLMS), etc., thereby generating a control instruction corresponding to the coefficients.

In this embodiment of the present disclosure, the analog signal is converted to a digital signal by an analog-to-digital converter, which can be compatible with the analog filter 130 for signal processing in the analog domain and the processing circuit 140 for signal processing in the digital domain to achieve the analog and digital combination, thereby broadening the application scenario of the active noise control audio device 100.

Because of the time required for the analog-to-digital conversion as well as the signal processing, in some embodiments, the processing circuit 140 may periodically send the control instruction to the analog filter 130. Correspondingly, the switching gating circuit can adjust the resistance value or the capacitance value of the response regulator to regulate the amplitude frequency response and the phase frequency response of the analog filter 130 during each cycle.

In some embodiments, the processing circuit 140 may determine the period for sending a control instruction based on one or more delay influencing factors such as the sampling rate of the analog-to-digital converter 130, the time for signal conversion, the switching gating circuit update time, and the time for processing the signal by the processing circuit 140. Exemplarily, when the sampling rate of the analog-to-digital converter is 16 kHz and the point-by-point update of the switching gating circuit takes about 0.06 ms, the analog filter 130 takes 1 ms to process the signal, and the analog-to-digital conversion as well as the switching gating circuit delay, etc. requires a delay of about 5 ms, the period for sending the control instruction may be determined to be 1 s. The specific time parameters provided above are for example reference only and are not specifically limited in this present disclosure.

In some embodiments, the processing circuit 140 may stop sending the control instruction to the analog filter 130 to stop regulating the amplitude frequency response and phase frequency response of the analog filter 130 when the active noise control audio device 100 is operating steadily. Further, the processing circuit 140 may stop sending the control instruction to the analog filter 130 when the amplitude of the first analog signal is within the preset amplitude range. When the amplitude of the first analog signal is within the preset amplitude range, it reflects that the first analog signal is close to zero, that is, it can reflect that the active noise control audio device 100 is in the ideal state of active noise control and works stably.

In some embodiments, as shown in FIG. 4, the active noise control audio device 100 may also include an amplifier 150, which may be combined with the analog filter 130 to amplify the first analog signal e(t). In some embodiments, the active noise control audio device 100 may also be provided without the amplifier 150 and amplify the first analog signal e(t) by means of the analog filter 130 only.

Figure 5:
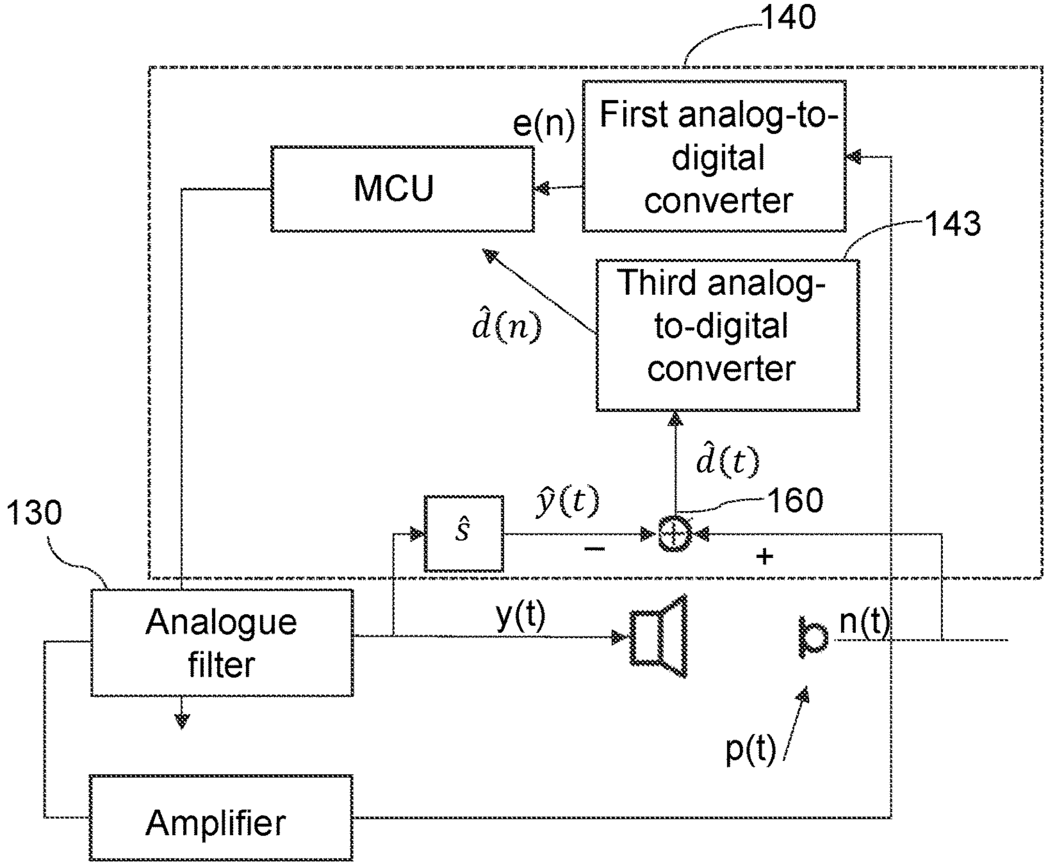
FIG. 5 is a schematic diagram illustrating a structure of an active noise control audio device according to some embodiments of the present disclosure.

In some embodiments, the active noise control audio device 100 may compensate for the secondary response because the presence of a secondary channel response in the audio device can affect the noise reduction effect. The secondary response is the response of the secondary channel in the audio device, which can reflect the effect of the sound transmission path from the speaker to the microphone on the sound signal. FIG. 5 details, by way of example, a specific implementation of compensation for the secondary response.

FIG. 5 is a schematic diagram illustrating a structure of an active noise control audio device according to some embodiments of the present disclosure.

As shown in FIG. 5, y(t) represents the second analog signal, $\hat{s}$ represents the secondary response, i.e., the transfer function from the speaker to the microphone, $\hat{y}(t)$ represents the secondary response signal, which can be understood as the second analog signal y(t) after adding the secondary response $\hat{s}$.

The analog adder is an electronic device that performs operations on multiple analog signals. In some embodiments, the analog adder may be an operational amplifier-based addition circuit, such as an inverting adder circuit, an in-phase adder circuit, etc. In some embodiments, the first analog adder may generate a third analog signal to compensate for the secondary response based on an addition operation performed on the first analog signal and the inverted secondary response signal. The third analog signal may reflect the superimposed acoustic wave of the environmental noise and the noise reduction sound canceled with the noise reduction sound reversed after the secondary channel, i.e., the environmental noise after the secondary response compensation.

Exemplarily, with continued reference to FIG. 5 above, $\hat{d}(t)$ represents the analog signal corresponding to the environmental noise after the secondary response compensation, i.e., the third analog signal output by the analog adder 160. In some embodiments, the relationship between the secondary response, the first analog signal, the second analog signal, and the third analog signal may be represented as:

$$\hat{d}(t)=e(t)-\hat{y}(t), \tag{5}$$

wherein $\hat{d}(t)$ is the third analog signal, $\hat{y}(t)$ is the secondary response signal, i.e., the second analog signal y(t) for adding the responses $\hat{s}$ from the speaker to the microphone, and e(t) is the first analog signal.

Accordingly, in some embodiments, the first analog-to-digital converter samples the first analog signal to generate the first digital signal and the third analog-to-digital converter samples the third analog signal to generate the third digital signal. The processing circuit 140 may send, based on the first digital signal and the third digital signal, a control instruction to the analog filter 130 to adjust the amplitude frequency response and the phase frequency response of the analog filter 130 while compensating for the secondary response.

Exemplarily, with continued reference to FIG. 5 above, the first analog-to-digital converter 141 samples the first analog signal e(t) to generate the first digital signal e(n) and the third analog-to-digital converter 143 samples the third analog signal $\hat{d}(t)$ to generate the third digital signal $\hat{d}(n)$. The processing circuit 140 may determine the coefficients of the analog filter 130 based on the first digital signal e(n) and the third digital signal $\hat{d}(n)$. In the case of compensating the secondary response, the coefficients of the analog filter 130 to be updated can be represented as:

$$w(n+1)=w(n)-\xi\hat{d}(n)e(n), \tag{6}$$

wherein w(n+1) is the current coefficient of the analog filter 130 to be updated, w(n) is the coefficient of the last update of the analog filter 130, $\hat{d}(n)$ is the third digital signal, e(n) is the first digital signal, and $\xi\hat{d}(n)e(n)$ is the adjusted value of the analog filter 130, which can be obtained after the signal processing of the first digital signal and the third digital signal by a noise reduction algorithm (e.g. LMS algorithm, FXLMS algorithm).

In some embodiments, after determining the coefficients of the analog filter 130 in the case of compensated secondary response, the processing circuit 140 sends the control instruction to the analog filter 130 so that the actual gain and phase shift of the analog filter 130 are close to the calculated updated coefficients, allowing the analog filter 130 to approach the optimal response to the environmental noise. The specific implementation of the adjustable analog filter 130 can be referred to the relevant contents of FIGS. 3A-FIG. 3B above and will not be repeated here.

In this embodiment of the present disclosure, the use of the analog adder to compensate for the secondary response enables a signal compensation in the analog domain to avoid a time delay when processing the signal in the digital domain, thereby enhancing the accuracy of noise reduction while ensuring that the analog filter 130 can process the external environmental noise in a timely manner and further improving the noise reduction effect of the active noise control audio device 100.

In some embodiments, when the active noise control audio device 100 is an open audio device (i.e., the speaker is close but not blocking the ear), the response of the channel between the user's ear canal and the microphone affects the noise reduction effect, so the active noise control audio device 100 can construct a transfer function between the user's ear canal and the microphone to compensate, i.e., perform an open response compensation.

The transfer function between the user's ear canal and the microphone may represent the effect on the transmission of sound between the user's ear canal and the microphone. In some embodiments, the transfer function between the user's ear canal and the microphone may be obtained by an experimental test, or based on a statistical model or a neural network model.

Exemplarily, the response $H_1$ between the speaker to the microphone and the response $H_2$ from the speaker to the user's ear canal may be obtained through a test (e.g., manual head test, etc.), and then the transfer function $\hat{V}$ between the user's ear canal and the microphone may be obtained based on the relational equation $\hat{v}=H_2/H_1$ between the response $H_1$ and the response $H_2$. Alternatively, the statistical model (e.g., hybrid Gaussian model, etc.) or the neural network model may be run to obtain the transfer function $\hat{V}$ of the model output based on the response $H_1$ from the speaker to the microphone.

In some embodiments, the active noise control audio device 100 may also include a first analog adder, a third analog-to-digital converter, and a fourth analog-to-digital converter. The fourth analog-to-digital converter may sample the secondary response signal to generate a fourth digital signal for signal processing by the processing circuit 140. The specific implementation of the analog adder and the analog-to-digital converter can be found in the relevant descriptions in FIGS. 4-5 above and will not be repeated here. The processing circuit 140 may determine a fifth digital signal based on the third digital signal, and the transfer function between the user's ear canal at the microphone, and send, based on the fourth digital signal and the fifth digital signal, the control instruction to the analog filter 130 to adjust the amplitude frequency response and phase frequency response of the analog filter 130 while compensating for the secondary response as well as the open response. Further, in some embodiments, the processing circuit 140 may perform an addition operation on the fourth digital signal and the fifth digital signal to obtain a sixth digital signal and send the control instruction to the analog filter 130 based on the third digital signal as well as the sixth digital signal.

Figure 6:
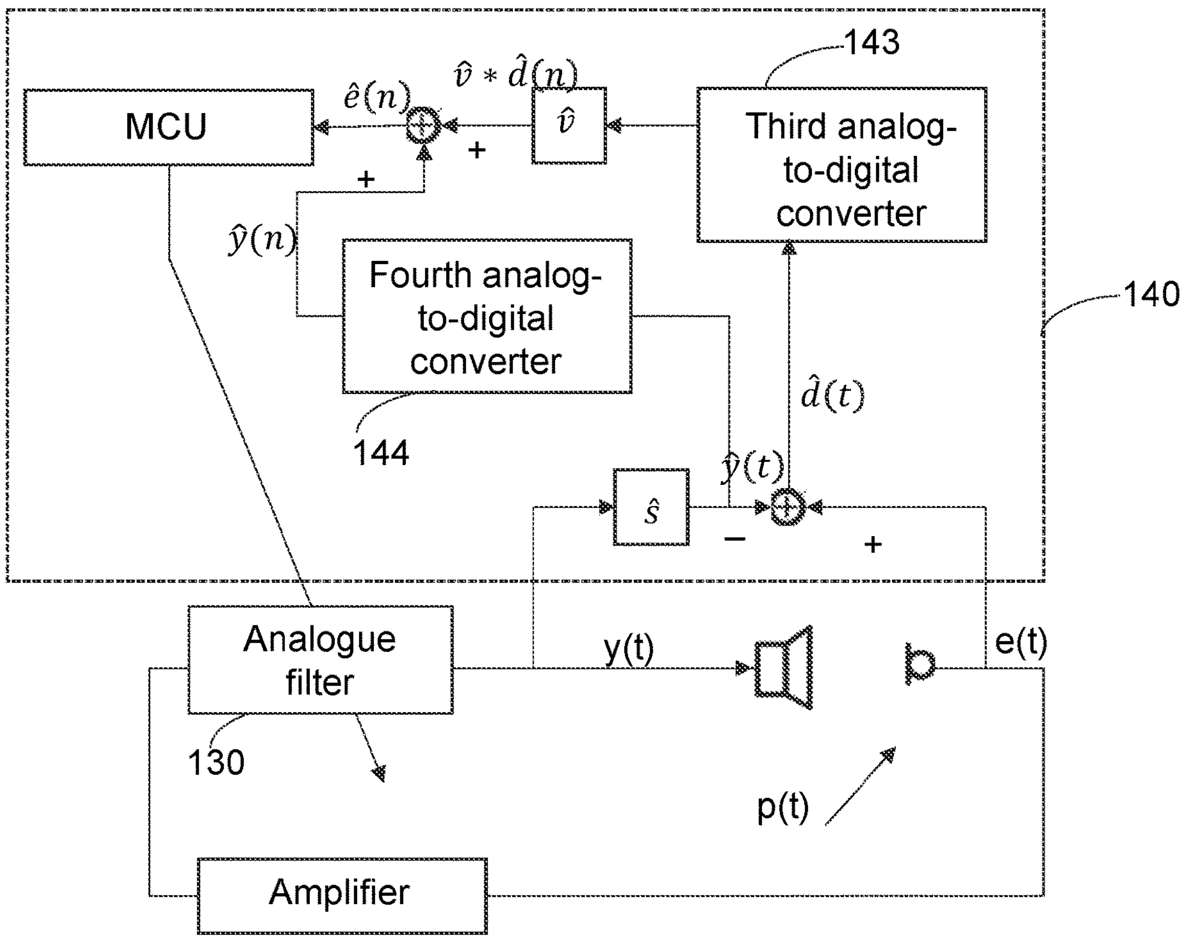
FIG. 6 is a schematic diagram illustrating a structure of an active noise control audio device according to some embodiments of the present disclosure.

The third digital signal may reflect the environmental noise after the secondary response compensation, the fourth digital signal may reflect the noise reduction sound after adding the secondary response, and the fifth digital signal may reflect the sound wave obtained after the secondary response compensation of the noise reduction sound under the influence of the open response. The sixth digital signal may reflect the sound wave obtained after the secondary response compensation and the open response compensation for the noise reduction sound. FIG. 6 details, by way of example, the specific implementation of the open response compensation.

FIG. 6 is a schematic diagram illustrating a structure of an active noise control audio device according to some embodiments of the present disclosure.

As shown in FIG. 6, $\hat{V}$ represents the transfer function between the user's ear canal and the microphone, the fourth analog-to-digital converter 144 may sample the secondary response signal $\hat{y}(t)$ to generate the fourth digital signal $\hat{y}(n)$, $\hat{v}*\hat{d}(n)$ represents the fifth digital signal under the influence of the open response, and $\hat{e}(n)$ represents the sixth digital signal after the secondary response compensation as well as the open response compensation. As a result, the relationship between the fifth digital signal, the fourth digital signal, and the third digital signal can be represented according to the transfer function between the user's ear canal and the microphone as:

$$\hat{e}(n)=\hat{v}(n)*\hat{d}(n)+\hat{y}(n), \tag{7}$$

wherein, $\hat{e}(n)$ is the sixth digital signal, $\hat{v}*\hat{d}(n)$ is the fifth digital signal, $\hat{v}(n)$ is the fourth digital signal, and $\hat{y}(t)=\hat{y}(t)*\hat{s}(t)$, * represents the convolution operation and $\hat{s}(t)$ is the transfer function corresponding to the secondary response. That is, the processing circuit 140 can perform an addition operation on the fourth digital signal $\hat{y}(n)$ and the fifth digital signal $\hat{v}*\hat{d}(n)$ to obtain the sixth digital signal $\hat{e}(n)$. The processing circuit 140 may also determine the coefficients of the analog filter 130 based on the third digital signal as well as the sixth digital signal. In the case of compensating the secondary response as well as the open response, updating the coefficient of the analog filter 130 can be represented as:

$$w'(n+1)=w'(n)-\xi\hat{d}(n)\hat{e}(n), \quad (8)$$

where, w'(n+1) is the coefficient of the analog filter 130 to be updated this time, '(n) is the coefficient of the last update of the analog filter 130, $\hat{d}(n)$ is the third digital signal, $\hat{e}(n)$ is the sixth digital signal, $\xi\hat{d}(n)\hat{e}(n)$ is the adjustment value of the analog filter 130, which can be obtained after signal processing of the third digital signal and the sixth digital signal by a noise reduction algorithm (such as LMS algorithm, FXLMS algorithm).

In some embodiments, the processing circuit 140, after determining the coefficients of the analog filter 130 while compensating for the secondary response as well as the open response, sends a control instruction to the analog filter 130 to bring the actual gain and phase shift of the analog filter 130 close to the calculated updated coefficients, and the analog filter 130 may approach the optimal response to the environmental noise. The specific implementation of the adjustable analog filter 130 can be referred to the relevant contents of FIGS. 3A-FIG. 3B above and will not be repeated here.

In this embodiment of the present disclosure, when the active noise control audio device 100 is an open audio device, the compensation of the transfer function between the user's ear canal and the microphone can improve the accuracy of noise reduction and ensure the noise reduction effect of the active noise control audio device 100.

Figure 7:
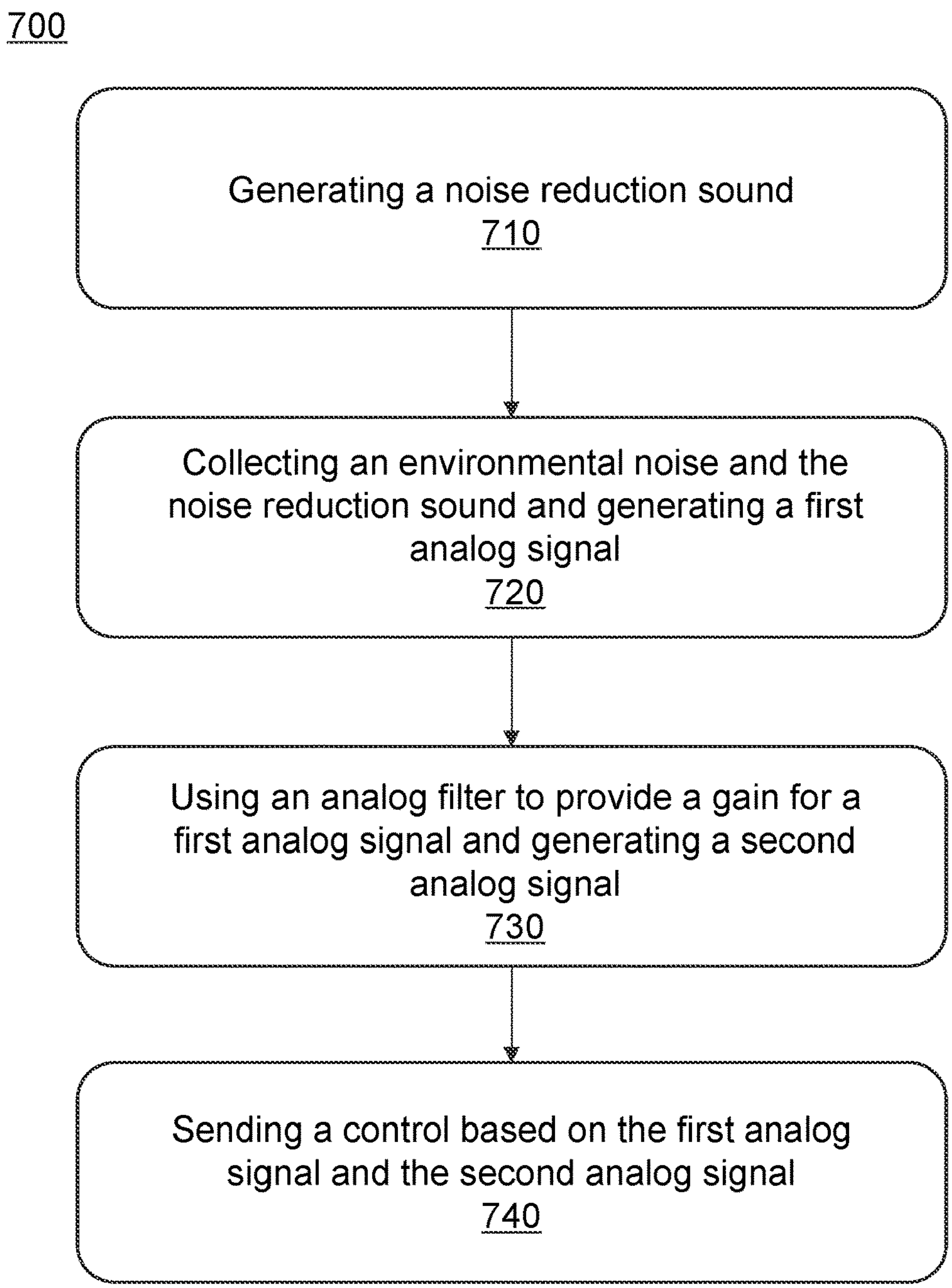
FIG. 7 is a flowchart illustrating an active noise control method according to some embodiments of the present disclosure.

FIG. 7 is a flow diagram illustrating an active noise control method according to some embodiments of the present disclosure. In some embodiments, process 700 may be implemented by the active noise control audio device 100.

In some embodiments, process 700 may include:

Step 710, the active noise control audio device generates a noise reduction sound. In some embodiments, the noise reduction sound may be used to offset an environmental noise to achieve a noise reduction effect. Step 710 may be performed by the above-mentioned speaker 110, the specific implementation of which can be referred to the relevant description of FIGS. 1-6 and will not be repeated here.

Step 720, the active noise control audio device collects an environmental noise and the noise reduction sound and generates a first analog signal. In some embodiments, the first analog signal may reflect the extent to which the environmental noise and the noise reduction sound offset with each other. Step 710 may be performed by the microphone 120 as described above and can be implemented by referring to the relevant descriptions in FIGS. 1-6 and will not be repeated here.

Step 730, the active noise control audio device uses an analog filter to provide a gain for a first analog signal and generate a second analog signal, the second analog signal being used to generate the noise reduction sound. In some embodiments, the second analog signal may be used to drive the speaker to produce the noise reduction sound. Step 730 may be performed by the analog filter 130 described above, which can be implemented by referring to the relevant descriptions in FIGS. 1-FIG. 6 and will not be repeated here.

Step 740, the active noise control audio device sends a control instruction to adjust the gain and a phase shift of the analog filter based on the first analog signal and the second analog signal. In some embodiments, the active noise control audio device may send the control instruction to the analog filter to drive the analog filter to adjust the gain and the phase shift. Step 740 may be performed by the analog filter 130 described above and can be implemented by referring to the relevant descriptions in FIGS. 1-FIG. 6, which will not be repeated here.

In this embodiment of the present disclosure, by using the analog filter to adjust the amplitude and phase of the analog signal and generating the noise reduction sound in this way, the signal conversion (such as digital-to-analog conversion, etc.) and the time delay caused by digital filtering processing can be reduced, and the noise reduction response can be performed in a timely manner, thus improving the noise reduction effect.

Moreover, the active noise control method provided in this embodiment of the present disclosure can also adjust the gain and phase shift of the analog filter according to the analog signal corresponding to the environmental noise and the noise reduction sound, in order to make the analog filter achieve the optimal response to the environmental noise and further improve the noise reduction effect.

In some embodiments, the adjusting the gain and the phase shift of the analog filter may include: controlling the analog filter to dynamically adjust its gain as the amplitude of the first analog signal changes over a specific time range for the active noise control audio device. In this way, the gain provided by the analog filter at a specific moment can be avoided to be too large or, in order to achieve the optimal response of the analog filter to the environmental noise, thus improving the noise reduction effect of the active noise control audio device.

In some embodiments, process 700 may also include: sampling the first analog signal to generate a first digital signal and sampling the second analog signal to generate a second digital signal. And step 740 above, may include: sending the control instruction based on the first digital signal and the second digital signal. The step of the sampling may be performed by the first analog-to-digital converter and the second analog-to-digital converter mentioned above, respectively, and the specific implementation can be referred to the relevant contents in FIGS. 1-FIG. 6, which will not be repeated here.

In the embodiment of this present disclosure, the gain and the phase shift of the analog filter are adjusted in such a way that the analog filter achieves an optimal response to the environmental noise and further improves the noise reduction effect by generating the control instruction based on the analog signal corresponding to the environmental noise and the noise reduction sound.

In some embodiments, process 700 may also include: adjusting a resistance value or a capacitive value of the response regulator of the analog filter to change an amplitude frequency response and a phase frequency response of the analog filter according to the control instruction. This step may be performed by the switching gating circuit of the analog filter, the specific implementation of which can be found in the relevant descriptions in FIGS. 3A-3B and will not be repeated here.

In some embodiments, the response regulator may include one or more phasing units, and each phasing unit may include at least one adjustable resistor or at least one adjustable capacitor. Accordingly, the adjusting the resistance value or the capacitance value of the response regulator of the analog filter according to the control instruction may include: adjusting the resistance value of the adjustable resistor or the capacitance value of the adjustable capacitor according to the control instruction. This step may be performed by the switching gating circuit of the analog filter, the specific implementation of which can be found in the relevant descriptions in FIGS. 3A-3B and will not be repeated here.

In this embodiment of the present disclosure, by adjusting the resistance value of the adjustable resistor or the capacitance value of the adjustable capacitor, the amplitude frequency response and phase frequency response of the analog filter can be controlled to avoid the analog filter from providing too much or too little gain at a specific moment, so as to achieve the optimal response of the analog filter to the environmental noise and thus improve the noise reduction effect of the active noise control audio device.

In some embodiments, process 700 may further include: generating a third analog signal based on the first analog signal, the second analog signal, and a secondary response corresponding to the second analog signal, the secondary response being a response from the speaker to the microphone. The active noise control audio device may also sample the first analog signal to generate a first digital signal and sample the third analog signal to generate a third digital signal. And step 740 above, may include: sending the control instruction based on the first digital signal and the third digital signal.

In some embodiments, the above step of generating the third analog signal may be performed by an analog adder, and the above step of sampling the third analog signal may be performed by a third analog-to-digital converter, as described in FIGS. 5-6, and will not be repeated here.

In this embodiment of the present disclosure, by compensating the secondary response in the analog domain, it is possible to avoid the time delays processing the signal in the digital domain resulting in, thereby improving the accuracy of noise reduction and further improving the noise reduction effect while ensuring that the active noise control audio device can process the external environmental noise in a timely manner.

In some embodiments, when the active noise control audio device is an open audio device, the active noise control audio device may construct a transfer function between the user's ear canal at the microphone to perform compensation, i.e., perform an open response compensation.

In some embodiments, process 700 may also include: generating a third analog signal based on the first analog signal, the second analog signal, and a secondary response corresponding to the second analog signal. The secondary response is a response from the speaker to the microphone. The active noise control audio device may sample the third analog signal to generate a third digital signal and sample the second analog signal after adding a secondary response to generate a fourth digital signal. And step 740 above, may include: determining a fifth digital signal based on the third digital signal, and a transfer function between the ear canal of the user and the microphone. The active noise control audio device may send the control instruction based on the fourth digital signal and the fifth digital signal.

In some embodiments, the above step of sampling the second analog signal after adding the secondary response may be performed by a fourth analog-to-digital converter, and the above step of determining the fifth digital signal may be performed by a processing circuit, as described in FIG. 6, and will not be repeated here.

In some embodiments, the transfer function between the user's ear canal and the microphone is obtained by an experimental test, or based on a statistical model or a neural network model. In some embodiments, process 700 may also include:

periodically sending the control instruction.

In this embodiment of the present disclosure, when the active noise control audio device is an open audio device, the active noise control audio device compensates for the transfer function between the user's ear canal at and the microphone, which can improve the accuracy of noise reduction and ensure the noise reduction effect.

Possible beneficial effects of embodiments of this present disclosure include, but are not limited to: (1) the use of the analog filter to directly process (e.g., gain or phase shift) the analog signal corresponding to the noise reduction sound can reduce the signal conversion (e.g., digital-to-analog conversion, etc.) as well as the time delay caused by the digital filter processing, allowing the audio device to perform the noise reduction response in a timely manner, thereby improving the noise reduction effect; (2) the processing circuit adjusts the gain and phase shift of the analog filter according to the analog signal corresponding to the environmental noise and the noise reduction sound, in order to make the analog filter achieve the optimal response to the environmental noise and further improve the noise reduction effect.

Having described the basic concepts above, it is clear that the above detailed disclosures are intended only as examples for technicians skilled in the art and do not constitute the qualification of this description. Although not explicitly, stated herein, various modifications, improvements and amendments may be made to this present disclosure by those skilled in the art. Such modifications, improvements and corrections are suggested in this description and therefore remain within the spirit and scope of the demonstration embodiments of this description.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, unless expressly stated in the claims, the order or elements and sequences of treatment, the use of alphanumeric numbers, or other names described in this description shall not be used to define the order of processes and methods in this description. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the invention. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

Finally, it should be understood that the embodiments described in this description are intended only to illustrate the principles of the embodiments of this description. Other deformation may also belong to the scope of the present disclosure. Therefore, as examples rather than restrictions, alternative configurations of the embodiments of this description may be considered to be consistent with the instruction of this description. Correspondingly, the embodiments of this description are not limited to the embodiments of the present disclosure specifically introduced and described in this description.

What is claimed is:

1. An active noise control audio device, comprising:

a speaker used to generate a noise reduction sound;

a microphone used to collect an environmental noise and the noise reduction sound and generate a first analog signal;

an analog filter used to provide a gain for the first analog signal and to generate a second analog signal, the second analog signal driving the speaker to generate the noise reduction sound; and a processing circuit used to send a control instruction to the analog filter to adjust the gain and a phase shift of the analog filter according to the first analog signal and the second analog signal.

2. The active noise control audio device of claim 1, wherein as a change of an amplitude of the first analog signal within a specific time range, the processing circuit controls the analog filter dynamically to adjust the gain of the analog filter.

3. The active noise control audio device of claim 1, wherein the processing circuit includes a first analog-to-digital converter and a second analog-to-digital converter;

the first analog-to-digital converter samples the first analog signal to generate a first digital signal, the second analog-to-digital converter samples the second analog signal to generate a second digital signal; and the processing circuit sends the control instruction to the analog filter based on the first digital signal and the second digital signal.

4. The active noise control audio device of claim 3, wherein the analog filter includes a switching gating circuit and a response regulator, wherein the switching gating circuit adjusts a resistance value or a capacitance value of the response regulator to change an amplitude frequency response and a phase frequency response of the analog filter according to the control instruction.

5. The active noise control audio device of claim 4, wherein the response regulator includes one or more phasing units, each phasing unit including at least one adjustable resistor or at least one adjustable capacitor;

the switching gating circuit adjusts the resistance value of the at least one adjustable resistor or the capacitance value of the at least one adjustable capacitor according to the control instruction.

6. The active noise control audio device of claim 1, further including a first analog adder, a first analog-to-digital converter, and a third analog-to-digital converter, wherein the first analog adder is used to generate a third analog signal based on the first analog signal, the second analog signal, and a secondary response corresponding to the second analog signal, the secondary response being a response from the speaker to the microphone;

the first analog-to-digital converter samples the first analog signal to generate a first digital signal;

the third analog-to-digital converter samples the third analog signal to generate a third digital signal;

the processing circuit sends the control instruction to the analog filter according to the first digital signal and the third digital signal.

7. The active noise control audio device of claim 1, further including a fixing structure, the fixing structure fixing the speaker and the microphone respectively in a position near an ear of a user and not blocking the ear canal of the user.

8. The active noise control audio device of claim 7, further including a first analog adder, a third analog-to-digital converter, and a fourth analog-to-digital converter, wherein the first analog adder is used to generate a third analog signal based on the first analog signal, the second analog signal, and a secondary response corresponding to the second analog signal;

the secondary response is a response from the speaker to the microphone;

the third analog-to-digital converter samples the third analog signal to generate a third digital signal;

the fourth analog-to-digital converter samples the second analog signal after adding the secondary response to generate a fourth digital signal;

the processing circuit determines a fifth digital signal based on the third digital signal and a transfer function between the ear canal of the user and the microphone, and sends the control instruction to the analog filter based on the fourth digital signal and the fifth digital signal.

9. The active noise control audio device of claim 8, wherein the transfer function between the ear canal of the user and the microphone is obtained by an experimental test, or based on a statistical model or a neural network model.

10. The active noise control audio device of claim 1, wherein the processing circuit periodically sends the control instruction to the analog filter.

11. An active noise control method, comprising:

generating a noise reduction sound;

collecting an environmental noise and the noise reduction sound and generating a first analog signal;

providing a gain for the first analog signal and to generate a second analog signal, the second analog signal driving the speaker to generate the noise reduction sound by using an analog filter; and sending a control instruction to adjust the gain and a phase shift of the analog filter according to the first analog signal and the second analog signal.

12. The active noise control method of claim 11, wherein the adjusting the gain and the phase shift of the analog filter includes:

as a change of an amplitude of the first analog signal within a specific time range, controlling the analog filter dynamically to adjust the gain of the analog filter.

13. The active noise control method of claim 11, further comprising:

sampling the first analog signal to generate a first digital signal; and sampling the second analog signal to generate a second digital signal; wherein the sending a control instruction includes:

sending the control instruction based on the first digital signal and the second digital signal.

14. The active noise control method of claim 13, further comprising:

adjusting a resistance value or a capacitance value of the response regulator to change an amplitude frequency response and a phase frequency response of the analog filter according to the control instruction.

15. The active noise control method of claim 14, wherein the response regulator includes one or more phasing units, each phasing unit including at least one adjustable resistor or at least one adjustable capacitor; and the adjusting the resistance value or the capacitance value of the response regulator according to the control instruction includes:

adjusting the resistance value of the adjustable resistor or the capacitance value of the adjustable capacitor according to the control instruction.

16. The active noise control method of claim 11, further comprising:

generating a third analog signal based on the first analog signal, the second analog signal, and a secondary response corresponding to the second analog signal, the secondary response being a response from the speaker to the microphone;

sampling the first analog signal to generate a first digital signal;

sampling the third analog signal to generate a third digital signal; wherein the sending a control instruction to the analog filter includes:

sending the control instruction according to the first digital signal and the third digital signal.

17. The active noise control method of claim 11, further comprising:

generating a third analog signal based on the first analog signal, the second analog signal, and a secondary response corresponding to the second analog signal; wherein the secondary response is a response from the speaker to the microphone;

sampling the third analog signal to generate a third digital signal; and sampling the second analog signal after adding the secondary response to generate a fourth digital signal; wherein the sending a control instruction includes:

determining a fifth digital signal based on the third digital signal, and a transfer function between the ear canal of the user and the microphone; and sending the control instruction based on the fourth digital signal and the fifth digital signal.

18. The active noise control method of claim 17, wherein the transfer function between the ear canal of the user and the microphone is obtained by an experimental test, or based on a statistical model or a neural network model.

19. The active noise control method of claim 11, wherein the method further includes: periodically sending the control instruction.

20. A non-transitory computer-readable storage medium storing computer instructions, wherein when reading the computer instructions in the storage medium, a computer implements the following method, comprising:

generating a noise reduction sound;

collecting an environmental noise and the noise reduction sound and generate a first analog signal;

providing a gain for the first analog signal and to generate a second analog signal, the second analog signal driving the speaker to generate the noise reduction sound by using an analog filter; and sending a control instruction to adjust the gain and a phase shift of the analog filter according to the first analog signal and the second analog signal.

* * * * *